United States Patent [19]

Brownscombe et al.

[11] 4,410,680

[45] Oct. 18, 1983

[54] TWO-PHASE, HEAT-CURABLE POLYEPOXIDE-UNSATURATED MONOMER COMPOSITIONS

[75] Inventors: Thomas F. Brownscombe, Houston; William W. C. Hart, Katy, both of Tex.

[73] Assignee: Shell Oil Company, Houston, Tex.

[21] Appl. No.: 439,256

[22] Filed: Nov. 4, 1982

[51] Int. Cl.$^3$ .............................................. C08G 59/56
[52] U.S. Cl. ...................................... 528/88; 525/502; 525/529; 528/121; 528/122; 528/123; 528/362; 528/365; 528/393
[58] Field of Search ................ 528/88, 121, 122, 123, 528/362, 365, 393; 525/529, 502

[56] References Cited

U.S. PATENT DOCUMENTS 2,939,859  7/1960  Rumscheidt et al. .............. 260/45.5
3,009,898  11/1961 Meyer et al. ...................... 260/45.5
3,099,638  7/1963  Foster ................................ 260/45.5
3,232,901  2/1966  Holm et al. ..................... 528/393 X
3,245,950  4/1966  Holm et al. ..................... 528/393 X Primary Examiner—Earl A. Nielsen
Attorney, Agent, or Firm—Norris E. Faringer

[57] ABSTRACT

A curable thermosetting resin, especially suitable for RIM applications, comprising a blend of
 (a) 100 parts by weight of a polyepoxide, particularly a normally liquid polyepoxide and more particularly a glycidyl polyether of a polyhydric phenol,
 (b) from about 10 to about 200 parts by weight of at least one ethylenically unsaturated monomer, especially an aromatic monomer, and preferably styrene,
 (c) a curing amount of an aliphatic or cycloaliphatic polyfunctional amine or a polyamide, and
 (d) an effective amount of an amine-compatible free-radical initiator.

9 Claims, No Drawings

TWO-PHASE, HEAT-CURABLE POLYEPOXIDE-UNSATURATED MONOMER COMPOSITIONS

This is a continuation of application Ser. No. 247,450, filed Mar. 25, 1981, now abandoned.

BACKGROUND OF THE INVENTION

Curable compositions comprising epoxy resins and styrene have generally been epoxy-polyester compositions wherein a portion of the polyester is replaced with styrene or other ethylenically unsaturated monomer. See, for example, U.S. Pat. Nos. 2,691,077, 3,574,157, and 3,634,542.

Polyepoxide resin and styrene blends are also known. These blends generally exhibit poor processability, short pot life, high viscosity and cure with conventional curing agents to produce products which do not exhibit good physical properties; such as high heat deflection temperatures and retention of physical properties at elevated temperatures. See, for example, U.S. Pat. No. 2,939,859 directed to a polyepoxide/styrene blend cured with peroxides or amines. While the compositions of U.S. Pat. No. 2,939,859 do exhibit a reduction of viscosity over an epoxy composition alone, the resulting products do not exhibit high heat deflection temperatures.

Other patents covering polyepoxide/styrene compositions include U.S. Pat. Nos. 3,099,638 and 3,009,898, which are directed to the use of anhydride curing agents, optionally in the presence of a peroxide and/or tertiary amine accelerator.

It has now been found that epoxy/styrene blends can be cured to produce a two-phase system exhibiting unpredictably improved physical properties, especially increased heat deflection temperatures and excellent retention of physical properties, even at elevated temperatures, with a special amine-peroxide curing combination, optionally in the presence of certain plasticizers, promoters, etc.

SUMMARY OF THE INVENTION

The present invention is directed to an improved epoxy-unsaturated aromatic monomer blend composition, which when mixed with a special peroxide/amine blend and heat-cured produces a two-phase composition exhibiting improved physical properties, particularly improved heat deflection temperatures.

More particularly, the invention is directed to a heat-curable thermosetting composition comprising (a) an epoxy compound, (b) a miscible amount of at least one ethylenically unsaturated monomer, (c) a curing amount of an aliphatic or cycloaliphatic polyfunctional amine or a polyamide, and (d) an amine-compatible free-radical initiator.

DESCRIPTION OF THE PREFERRED EMBODIMENTS

It has now been found that heat-curable thermosetting resin compositions exhibiting improved physical properties, particularly improved heat deflection temperatures, increased flexural strength and increased flexibility (ductility), are obtained from blends of polyepoxides and unsaturated monomers, especially ethylenically unsaturated aromatic monomers such as styrene, using a unique curing combination comprising an aliphatic or cycloaliphatic amine and a free-radical initiator such as a peroxide.

Accordingly, the present invention is directed to a curable thermosetting resin composition comprising a blend of
(a) 100 parts by weight of a polyepoxide, particularly a normally liquid polyepoxide and more particularly a glycidyl polyether of a polyhydric phenol,
(b) a miscible amount, e.g., from about 10 to about 200 parts by weight of at least one ethylenically unsaturated monomer, especially an aromatic monomer, and preferably styrene,
(c) a curing amount of an aliphatic or cycloaliphatic polyfunctional amine or a polyamide, and
(d) an effective amount of an amine-compatible free-radical initiator.

Polyepoxides

Suitable polyepoxides used to prepare the present compositions comprise those compounds containing at least one vicinal epoxy or oxirane group, i.e., at least one

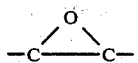

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meanings of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,373,221 and 3,377,406 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336.241 are suitable for use in the present compositions. Accordingly, the relevant disclosure of U.S. Pat. No. 3,336.241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

citraconic acid, fumaric acid, cyanoacrylic acid, methoxyacrylic acid, and the like. Very preferred acids are acrylic acid and methacrylic acid. Accordingly, suitable such esters include, methyl methacrylate, ethyl acrylate, butyl acrylate, butyl methacrylate, isobutyl methacrylate, pentaerythritol triacrylate, trimethylolpropane trimethyacrylate, and the like.

Suitable cyano-compounds include acrylonitrile and methacrylonitrile.

Suitable allyl monomers include diallyl phthalate and triallyl isocyanurate.

Other suitable comonomers include the unsaturated aliphatic compounds such as the olefins and diolefins. Operable such olefins and diolefins include ethylene, propylene, butylene, amylene, butadiene, cyclopentene, norbornadiene, cyclopentadiene, cyclopentadiene dimer and the like. It will be appreciated that since some of these monomers are normally gases at ambient temperatures and pressures, their use dictates that the compositions be formulated and cured under pressure conditions. Accordingly, their use is especially useful in the so-called reaction injection molding (RIM) techniques.

As noted hereinbefore, the resinous portion of the composition comprises a miscible blend of polyepoxide and ethylenically unsaturated monomer, usually a blend of a 100 parts by weight polyepoxide and from about 10 to about 200 parts by weight of at least one ethylenically unsaturated monomer. If desired, any of the above defined monomers may be used singly or in blends with

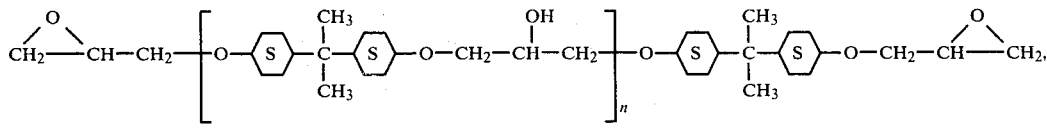

wherein n has a value so that the average molecular weight of the saturated polyepoxide is from about 350 to about 3,000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., phenolaldehyde condensates, as described in U.S. Pat. No. 2,658,885.

Ethylenically Unsaturated Monomers

The preferred ethylenically unsaturated monomers are the unsaturated aromatic monomers such as styrene, alpha-methyl styrene; halo-substituted styrenes such as chlorostyrene; nitro-substituted styrenes such as nitrostyrene; alkyl-substituted styrenes such as tertiary-butyl styrene; divinylbenzene, vinyl toluene; 2-vinyl pyridine; n-vinyl pyrrolidone, and vinyl naphthalene. Especially preferred is styrene.

Other suitable monomers which are preferably blended with styrene include, (1) esters of ethylenically unsaturated carboxylic acids, (2) cyano-containing unsaturated compounds, (3) allyl-containing compounds, and (4) olefins or diolefins.

Suitable unsaturated monocarboxylic acid esters include the alkyl esters of ethylenically unsaturated acids such as acrylic acid, methacrylic acid, crotonic acid, alpha-phenylacrylic acid, alpha-cyclohexylacrylic acid, maleic acid, alpha-chloromaleic acid, itaconic acid, one or more comonomers. Compositions exhibiting improved properties comprise a major proportion of an aromatic unsaturated monomer such as styrene.

Amino-Containing Compounds

Suitable amino-containing curing agents comprise the aliphatic and cycloaliphatic polyfunctional amines and the polyamides.

Suitable polyfunctional amines may have the following general structure:

wherein each R is an alkyl, aryl or alkaryl radical of up to about 8 carbon atoms and x has a value of from about 0 to about 10, and preferably 1 to 3.

Examples of suitable such polyfunctional amines include, among others, diethylenetriamine

as well as cycloaliphatic amines such as diaminocyclohexane and

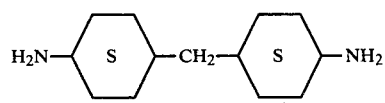

Very suitable polyfunctional amines are the polyoxypropyleneamines (aliphatic, terminally-branched, primary di- and tri-amines, structurally derived from polypropylene glycols and triols) commercially available under the trade designation "JEFFAMINE". A typical structure is as follows

   (1)

wherein x has an approximate value of from about 2.5 to about 3.5.

Polyamides which are suitable for use in the present compositions may be saturated or unsaturated as well as monomeric or polymeric.

Polyamides which are especially useful in the present compositions are those derived from polymeric fatty acids and aliphatic polyamines. Polyamides of this type are disclosed in U.S. Pat. No. 2,450,940. Typically, these polyamides are those made from polymeric fatty acids containing up to about 22 carbon atoms in the monomeric acid with ethylene diamine and/or diethylene triamine. It will be appreciated that polyamide resins having terminal amine groups or terminal carboxyl groups or in which some of the terminal groups are amine groups while others are carboxyl groups.

The polymeric fatty acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fatty acid, the fatty acids with sufficient double bond functionality combine for the most part, probably by a Diels Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fatty acids" as used herein, is intended to include the polymerized mixture of acids obtained, which mixture usually contains a predominant portion of dimeric acids, a smaller quantity of trimeric and higher polymeric acids, and some residual monomer.

These polymeric fatty acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000 and are resistant to the corrosive action of water, alkali, acids, oils, greases, and organic solvents. The melting points vary, depending upon the reactants and the reaction conditions. Where aliphatic diamines, such as ethylene diamine, are employed for the preparation of the polyamide the resin may melt within the approximate range of 100°–120° C., and usually within the range of 100°–105° C.

Higher melting polyamide resins, for example melting within the range of 130°–215° C., may be made by employing a mixture of polymeric fatty acids and other polybasic acids, the latter having at least two carboxyl groups which are separated by at least 3 and not more than 8 carbon atoms. Typical of these polybasic acids are the aliphatic acids, glutaric, adipic, pimelic, suberic, azelaic, and sebacic, and the aromatic acids, terephthalic, and isophthalic acids. The melting point of the copolymer resin may vary within the range previously indicated, depending upon the particular reactants, relative ratios thereof, as well as the reaction conditions.

Low melting polyamide resins melting within the approximate range of 25°–90° C. may be prepared from polymeric fatty acids and aliphatic polyamines having at least 3 atoms intervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino)-propylamine, 3,3'-imino-bispropylamine, and the like. A preferred group of these low melting polyamides are derived from polymer fatty acids, and diethylene triamine and are liquid at room temperature.

Suitable such polyamides are commercially available under the trade designation of VERSAMID ® Polyamide resins and are amber-colored polyamides having a molecular weight ranging from about 3,000 to about 10,000 and a softening point from about below room temperature to 190° C. and prepared by condensing polymerized unsaturated fatty acids (e.g., dilinoleic acid) with aliphatic polyamines such as diethylene triamine.

The preparation of such VERSAMID ® polyamide resins is wellknown and by varying the acid and/or the functionality of the polyamine, a great variety of viscosities, molecular weights and levels of active amino groups spaced along the resin molecule can be obtained. Typically, the VERSAMID ® polyamide resin have amine values from about 50 to 400; Gardner color (max.) of 8–10; and viscosities of from about 1 to 30 poises.

The amount of polyfunctional amine or polyamide is a curing amount. Generally the amount will be a near stoichiometric amount, although up to about 50% excess of ether reactant may be employed. A stoichiometric amount is an amount to provide one amino hydrogen to one epoxy group.

Free-Radical Initiator

As stated hereinbefore, an effective amount of an amine-compatible free-radical initiator is employed.

As used herein, the term "amine-compatible" is deemed to mean essentially no reaction between the selected amine or polyamide and the selected peroxide. A simple test comprises mixing the amine preferably in the presence of the resin with the peroxide at a temperature below the decomposition temperature of the peroxide. If there is no appearance of an odor or color, or any other evidence of decomposition, then the peroxide is said to be "amine-compatible".

Particularly preferred peroxides are the sterically hindered peroxyesters and alkyl peroxides such as tertiary-butyl peroxybenzoate, 2-5-dimethyl-2,5-bis(2-ethyl hexanoylperoxy)hexane, di-tertiary-butyl peroxide, di-tertiary-butyl-2,5-dimethyl-2,5-peroxyhexane, t-butyl peroxy neodecanoate, t-butyl peroxy pivalate, t-butyl peroctoate, t-butyl peroxy isobutyrate, t-butyl peroxy maleate and t-cumylperoxy neodecanoate.

Peroxides which were found to be essentially unsuitable include benzoyl peroxide, hydroperoxides such as tertiary-butylhydroperoxide, methyl ethyl ketone peroxide, acetone peroxide and hydrogen peroxide.

In general, the amount of peroxide employed will range widely, but will be in an amount which is sufficient to effect the desired cure or crosslinking. Preferably, the amount of peroxide will vary from about 0.25% to about 15% based on the unsaturated monomer.

The selection of the amine of the peroxy compound should preferably be one wherein the particular amine tends to start the cure of the epoxy groups before the peroxide initiates the vinyl polymerization at the temperatures employed.

The present compositions may be prepared by various techniques. If, for example, the instant compositions are to be utilized with a short time, they can be prepared by simply mixing all the components, adding the customary additives such as fillers, impact modifiers such as ABN, CTBN, isocyanate-terminated elastomers, vinyl-terminated elastomers (HYCAR elastomers) etc., reinforcement flake or fibers, mats or webs, pigments, flame retardant agents, plasticizers, stabilizers, extenders, antioxidants and promoters, accelerators, thixotropic agents, etc., and then molding and curing the composition.

Under certain conditions it may be desirable to utilize a two-package system wherein the epoxy-comonomer blend is one package and the other package comprises the curing agents, etc.

Another two package system comprises an epoxy-peroxide blend and a comonomer-amine blend which additionally may contain one or more reaction promoters or accelerators such as cobalt octoate, cobalt naphthenate, stannous octoate, dimethyl aniline, etc. Various other modifications will become apparent to one skilled in the art.

A very preferred method comprises mixing the polyepoxide with an unsaturated aromatic monomer and then adding the amine, peroxide, pigments, reinforcing agents, etc. The total mixture is then mixed thoroughly and heated at about 50° C. to 150° C. for from about 25 minutes to about 4 hours.

It will be appreciated that the cure can be performed at lower temperatures, e.g., room temperatures and lower, by the addition of suitable well-known reaction promotors such as cobalt naphthenate, cobalt octoate, stannous octoate, dimethyl aniline, and the like.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates, molding powders fluidized bed powders, potting compounds, etc. A very suitable application is in the preparation of reinforced products and laminates wherein the compositions are applied to fibrous products such as glass fibers or mats and the material formed into the desired object and cured.

By the addition of suitable promotors and the like, the present compositions are especially suitable in reaction injection molding (RIM), pressure gelation molding and the like.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis-(4-hydroxyphenyl)propane having an epoxide equivalent weight of 175–190 and an average molecular weight of about 350.

Epoxy Resin B is a liquid glycidyl polyether of 2.2-bis(4-hydroxyphenyl)propane having an epoxide equivalent weight of 180–195 and an average molecular weight of about 380.

Epoxy Resin C is a solid glycidyl polyether of 2,2-bis(4-hydroxyphenyl)propane having a epoxide equivalent weight of 450–500 and an average molecular weight of about 900.

Epoxy Resin D is a solid glycidyl polyether of 2,2-bis-(4-hydroxyphenyl)propane having an epoxide equivalent weight of 900 to 1025 and an average molecular weight of about 1400.

Epoxy Resin E is a solid epoxy resin prepared by the fusion reaction of Epoxy Resin B with 2,2-bis(4-hydroxyphenyl)propane having an epoxide equivalent weight of about 800 and an average molecular weight of about 1650.

Epoxy Resin F is a saturated glycidyl polyether of hydrogenated 2,2-bis(4-hydroxyphenyl)propane having an epoxide equivalent weight of 180–195 and an average molecular weight of about 350.

PACM-20 is a 20% isomeric mixture of 4,4'-di(cyclohexyl amino)-methane.

LUPERSOL 256 is 2,5-dimethyl-2,5-bis(2-ethyl-hexanoylperoxy)hexane.

GENAMIDE 250 (G-250) is polyamide derived by reacting a $C_{18}$ dimer acid with triethylenetetramine.

The following abbreviations were used in the examples:

HDT is Heat Deflection Temperature, °C.
$\epsilon_b$ is Elongation at break, %
$\sigma_y$ is Tensile yield stress, psi
$\sigma_b$ is Tensile breaking stress, psi
E is Young's Modulus, psi
NI is Notched Izod, ft lb/inch of notch
IIT is Instrumented Impact Test, in-lb
UNC is Un-notched Charpy, ft lb

EXAMPLE I

This example illustrates the improved physical properties, especially high heat deflection temperature of an epoxy/styrene composition where cured with the special amine-peroxide curing system.

| Components | Parts by Weight |
|---|---|
| Epoxy Resin B | 100 |
| Styrene | Variable |
| PACM-20 | 29 |
| Lupersol 256 | 0.5–2.4 |
| Divinyl benzene | Variable |
| Methacrylonitrile | Variable |

Various compositions were prepared from the above-noted components which were cured at 60° C. for 2 hours and then post cured at 120° C. for two hours. The resulting cured compositions were then physically evaluated. The data is presented in Table I.

EXAMPLE II

This example illustrates the ineffectiveness of benzoyl peroxide and the effectiveness of Lupersol 256 as a free-radical initiator.

The procedure of this Example was essentially repeated using the following compositions:

TABLE I

| | | COMPOSITION | | | | | PHYSICAL PROPERTIES | | | | | | |
| | | Pbw | | | | | | | | | | Notched | |
| Epoxy Resin B | PACM-20 | Styrene | Lupersol 256 | Divinyl Benzene | Methacrylonitrile | HDT °C. | $\epsilon_b$ % | $\sigma_y$ psi | $\sigma_b$ psi | E psi | Izod Ft #/In | IIT In-# |
|---|---|---|---|---|---|---|---|---|---|---|---|---|
| 100 | 29 | — | — | — | — | 100 | 1.8 | 5,250 | 5,250 | 355,000 | 0.24 | 11 |
| 100 | 29 | 100 | 1.5 | — | — | 105 | 4.4 | 10,900 | 9,740 | 406,000 | 0.45 | 11 |
| 100 | 29 | 50 | 1.1 | — | — | 116 | 8.3 | 10,410 | 9,730 | 413,000 | 0.41 | 10 |
| 100 | 29 | 20 | 0.5 | — | — | 128 | 9.5 | 10,790 | 10,630 | 374,000 | 0.43 | 17 |
| 100 | 29 | 78 | 2.4 | 22 | — | 127 | 2.1 | 6,700 | 6,700 | 396,000 | 0.20 | 4 |
| 100 | 29 | 67 | 2.4 | 33 | — | 134 | 1.9 | 6,500 | 6,500 | 385,000 | 0.20 | 3 |
| 100 | 29 | 78 | 2.3 | — | 22 | — | 3.7 | 9,700 | 9,700 | 439,000 | 0.45 | 7 |

TABLE II

| | | COMPOSITION | | | | | PHYSICAL PROPERTIES | | | | | |
| | | Pbw | | | | | | | | | Notched | Un-Notched |
| Epoxy Resin C | Epoxy Resin E | G-250 | Styrene | Lupersol 256 | Methyl Methacrylate | HDT °C. | $\epsilon_b$ % | $\sigma_y$ psi | $\sigma_b$ psi | E psi | Izod Ft #/In | Charpy In-# |
|---|---|---|---|---|---|---|---|---|---|---|---|---|
| 100 | — | 21.2 | 100 | 3.0 | — | 78 | 2.5 | 7,500 | 7,500 | 394,000 | 0.40 | 0.40 |
| 100 | — | 21.2 | 50 | 3.0 | 50 | 77 | 5.0 | 8,000 | 6,700 | 340,000 | 0.43 | 0.93 |
| — | 100 | 13.4 | 100 | 3.0 | — | 73 | 2.3 | 7,700 | 7,700 | 430,000 | 0.36 | 0.41 |
| — | 100 | 13.4 | 50 | 3.0 | 50 | 80 | 4.8 | 8,300 | 8,000 | 475,000 | 0.42 | 0.46 |

| Components | A | B |
|---|---|---|
| Epoxy Resin B | 100 | 100 |
| G-250 | 54 | 54 |
| Styrene | 100 | 100 |
| Benzoyl peroxide | 1.5 | — |
| LUPERSOL 256 (L-256) | — | 1.5 |

Composition A resulted in a viscous, untestable material with a strong odor. Composition B had the following properties:
HDT—55° C.
$\epsilon_b$—3.0%
$\sigma_y$—7710 psi
$\sigma_b$—7750 psi
E—372,000 psi
N.I.—0.27 ft lb/inch
I.I.T.—4 inch-lb

EXAMPLE III

The procedures of Example I were essentially repeated wherein various other epoxy resins were employed. The resulting data is presented in Table II.

EXAMPLE IV

The procedures of Example I were essentially repeated wherein Epoxy Resins A, D and F were used. Related results were obtained.

EXAMPLE V

The procedures of Example I were essentially repeated wherein the peroxide used was t-butylperoxybenzoate. Related results were obtained.

EXAMPLE VI

The procedures of Example I were essentially repeated wherein the amine used was diethylene triamine. Related results were obtained.

What is claimed is:

1. A curable thermosetting resin composition comprising a blend of
   (1) 100 parts by weight of a epoxy compound containing at least one vicinal epoxy group in the molecule,
   (2) from about 10 to about 200 parts by weight of at least one ethylenically unsaturated aromatic monomer,
   (3) a curing amount of 4,4'-di(cyclohexylamino)methane and
   (4) an effective amount of 2,5-dimethyl-2,5-bis(2-ethylhexanoylperoxy)hexane.

2. The composition of claim 1 wherein the epoxy compound is a glycidyl polyether of a polyhydric phenol.

3. The composition of claim 2 wherein the polyhydric phenol is 2,2-bis(4-hydroxyphenyl)propane.

4. The composition of claim 2 wherein the polyhydric phenol is hydrogenated 2,2-bis(4-hydroxyphenyl)propane.

5. The composition of claim 1 wherein the ethylenically unsaturated aromatic monomer is styrene.

6. The composition of claim 5 wherein up to about 80% of the styrene is replaced with a compatible unsaturated comonomer.

7. The composition of claim 6 wherein the comonomer is divinylbenzene.

8. The composition of claim 6 wherein the comonomer is methylmethacrylate.

9. The composition of claim 6 wherein the comonomer is methacrylonitrile.

* * * * *